United States Patent
Beltowski et al.

(10) Patent No.: US 9,086,999 B2
(45) Date of Patent: Jul. 21, 2015

(54) DATA ENCRYPTION MANAGEMENT

(75) Inventors: Piotr Beltowski, Krakow (PL); Rossella De Gaetano, Rome (IT); David W. Knapp, Jr., Piaseczno (PL); Wojciech M. Kocjan, Krakow (PL)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 13/176,607

(22) Filed: Jul. 5, 2011

(65) Prior Publication Data
US 2013/0013930 A1    Jan. 10, 2013

(51) Int. Cl.
G06F 11/30 (2006.01)
G06F 12/14 (2006.01)
G06F 21/78 (2013.01)

(52) U.S. Cl.
CPC ........ *G06F 12/1408* (2013.01); *G06F 12/1425* (2013.01); *G06F 21/78* (2013.01); *G06F 2221/2107* (2013.01)

(58) Field of Classification Search
CPC .... G06F 12/1425; G06F 12/145; G06F 21/80
USPC ........................................................ 713/189
See application file for complete search history.

(56) References Cited

U.S. PATENT DOCUMENTS

| 6,684,289 | B1 * | 1/2004 | Gonzalez et al. | 711/103 |
| 8,041,959 | B2 | 10/2011 | Kito et al. | |
| 8,108,693 | B2 * | 1/2012 | Atzmon et al. | 713/193 |
| 8,799,681 | B1 * | 8/2014 | Linnell et al. | 713/193 |
| 2004/0210582 | A1 * | 10/2004 | Chatterjee et al. | 707/9 |
| 2007/0050642 | A1 * | 3/2007 | Flynn et al. | 713/192 |
| 2007/0083473 | A1 | 4/2007 | Farrugia et al. | |
| 2007/0118688 | A1 * | 5/2007 | Lee et al. | 711/113 |
| 2007/0294496 | A1 * | 12/2007 | Goss et al. | 711/163 |
| 2008/0263369 | A1 * | 10/2008 | Min et al. | 713/193 |
| 2009/0150599 | A1 * | 6/2009 | Bennett | 711/103 |
| 2010/0031058 | A1 | 2/2010 | Kito et al. | |
| 2010/0174917 | A1 | 7/2010 | Katata | |

(Continued)

FOREIGN PATENT DOCUMENTS

EP    1619896 A2    1/2006
EP    2209077 A2    7/2010

OTHER PUBLICATIONS

"Hidden Volume," TrueCrypt Free Open-Source On-The Fly Encryption, Oct. 2012, 2 pages, accessed Dec. 10, 2012 http://www.truecrypt.org/hiddenvolume.

(Continued)

*Primary Examiner* — Esther B Henderson
(74) *Attorney, Agent, or Firm* — Yee & Associates, P.C.; Jeffrey S. LaBaw

(57) ABSTRACT

A method, computer program product, and apparatus for managing encrypted data are provided. A respective set of sectors in each page of the volume is selected for storing data based on a respective key in a number of keys responsive to receiving a request to store the data in the volume and an identification of the number of keys with which users are allowed to store the data in the volume. Selection of the respective set of sectors is a function of a value of the respective key and a number of available sectors within a page and the volume is much larger than the data. The data is encrypted using the respective key to form the encrypted data. The encrypted data is stored in the respective set of sectors in the page in the volume.

17 Claims, 9 Drawing Sheets

(56) References Cited

U.S. PATENT DOCUMENTS

2011/0090734 A1* 4/2011 Burger et al. ............ 365/185.03
2012/0226887 A1* 9/2012 Culley et al. ................. 711/202

OTHER PUBLICATIONS

"PhoneBook Project," http://www.freenet.org.nz/phonebook, May 2010, 17 pages, accessed Dec. 10, 2012 http://web.archive.org/web/20100525225802/http://www.freenet.org.nz/phonebook/.

"The Idiot Savants' Guide to Rubberhose," http://iq.org/~proff/rubberhose.org/current/src/doc/maruguide/x32.html, May 2010, 11 pages, accessed Dec. 10, 2012 http://iq.org/~proff/rubberhose.org/current/src/doc/maruguide/x32.html.

"Disk Encryption Software," Wikipedia, May 2012, 4 pages, accessed Dec. 10, 2012 http://en.wikipedia.org/wiki/Disk_encryption_software.

"Deniable Encryption," Wikipedia, Nov. 2012, 5 pages, accessed Dec. 10, 2012 http://en.wikipedia.org/wiki/Deniable_encryption.

"Block Cipher Modes of Operation," Wikipedia, Nov. 2012, 13 pages, accessed Dec. 12, 2012 http://en.wikipedia.org/wiki/Block_cipher_modes_of_operation.

"Plausible Deniability," TrueCrypt Free Open-Source On-The Fly Encryption, Oct. 2012, 1 page, accessed Dec. 12, 2012 http://www.truecrypt.org/docs/?s=plausible-deniability.

Bunter, "TrueCrypt: An Encryption Solution for Vista," J.F. Amprimoz, ed., Bright Hub, Feb. 2011, 4 pages, accessed Dec. 12, 2012 http://www.brighthub.com/computing/smb-security/articles/33712.aspx.

* cited by examiner

| DATA TO STORE | AVAILABLE SECTORS LIST | CRC | CRC MODULO ASL LENGTH | SELECTED SECTOR |
|---|---|---|---|---|
| PRIMARY KEY SECTOR 0 | {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31} | 0x8bfd4d1d | 29 | 29 |
| PRIMARY KEY SECTOR 1 | {0, 1, 2, 3, 4, 5, 6, 7, 8, 9, 10, 11, 12, 13, 14, 15, 16, 17, 18, 19, 20, 21, 22, 23, 24, 25, 26, 27, 28, 30, 31} | 0xddfd9b94 | 5 | 5 |
| PRIMARY KEY SECTOR 2 | {0, 1, 2, 3, 4, 6, 7, 8, 9, 10, 11, 12, 13, 14, 15, 16, 17, 18, 19, 20, 21, 22, 23, 24, 25, 26, 27, 28, 30, 31} | 0x18e9d9d3 | 25 | 26 |
| PRIMARY KEY SECTOR 3 | {0, 1, 2, 3, 4, 6, 7, 8, 9, 10, 11, 12, 13, 14, 15, 16, 17, 18, 19, 20, 21, 22, 23, 24, 25, 27, 28, 30, 31} | 0x3c3cbac9 | 28 | 31 |
| PRIMARY KEY SECTOR 4 | {0, 1, 2, 3, 4, 6, 7, 8, 9, 10, 11, 12, 13, 14, 15, 16, 17, 18, 19, 20, 21, 22, 23, 24, 25, 27, 28, 30} | 0xd8a2ec9f | 19 | 20 |
| PRIMARY KEY SECTOR 5 | {0, 1, 2, 3, 4, 6, 7, 8, 9, 10, 11, 12, 13, 14, 15, 16, 17, 18, 19, 21, 22, 23, 24, 25, 27, 28, 30} | 0x909a2eac | 21 | 23 |
| PRIMARY KEY SECTOR 6 | {0, 1, 2, 3, 4, 6, 7, 8, 9, 10, 11, 12, 13, 14, 15, 16, 17, 18, 19, 21, 22, 24, 25, 27, 28, 30} | 0x2e91eb99 | 19 | 21 |
| PRIMARY KEY SECTOR 7 | {0, 1, 2, 3, 4, 6, 7, 8, 9, 10, 11, 12, 13, 14, 15, 16, 17, 18, 19, 22, 24, 25, 27, 28, 30} | 0x6820133a | 13 | 14 |
| SECONDARY KEY 1 SECTOR 0 | {0, 1, 2, 3, 4, 6, 7, 8, 9, 10, 11, 12, 13, 15, 16, 17, 18, 19, 22, 24, 25, 27, 28, 30} | 0x85c0bf48 | 0 | 0 |
| SECONDARY KEY 1 SECTOR 1 | {1, 2, 3, 4, 6, 7, 8, 9, 10, 11, 12, 13, 15, 16, 17, 18, 19, 22, 24, 25, 27, 28, 30} | 0xe88e3941 | 4 | 6 |
| SECONDARY KEY 1 SECTOR 2 | {1, 2, 3, 4, 7, 8, 9, 10, 11, 12, 13, 15, 16, 17, 18, 19, 22, 24, 25, 27, 28, 30} | 0x4ed79ba6 | 8 | 11 |
| SECONDARY KEY 1 SECTOR 3 | {1, 2, 3, 4, 7, 8, 9, 10, 12, 13, 15, 16, 17, 18, 19, 22, 24, 25, 27, 28, 30} | 0x5feae24f | 13 | 18 |
| SECONDARY KEY 1 SECTOR 4 | {1, 2, 3, 4, 7, 8, 9, 10, 12, 13, 15, 16, 17, 19, 22, 24, 25, 27, 28, 30} | 0xc3108ace | 10 | 15 |
| SECONDARY KEY 1 SECTOR 5 | {1, 2, 3, 4, 7, 8, 9, 10, 12, 13, 16, 17, 19, 22, 24, 25, 27, 28, 30} | 0xeb355656 | 15 | 25 |
| SECONDARY KEY 1 SECTOR 6 | {1, 2, 3, 4, 7, 8, 9, 10, 12, 13, 16, 17, 19, 22, 24, 27, 28, 30} | 0x6ac91ec7 | 5 | 8 |
| SECONDARY KEY 1 SECTOR 7 | {1, 2, 3, 4, 7, 9, 10, 12, 13, 16, 17, 19, 22, 24, 27, 28, 30} | 0x27d3983 | 15 | 28 |

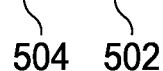
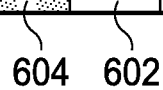

DATA ENCRYPTION MANAGEMENT

BACKGROUND

1. Field

The disclosure relates generally to an improved data processing system and more specifically to data encryption. Even more specifically, the disclosure relates to a method, apparatus, and computer program product for managing encryption of data.

2. Description of the Related Art

Data is often encrypted before being stored in a data processing system. This process limits access to the data to authorized users. Encryption is a process of modifying data into encrypted data using an algorithm. The algorithm uses the contents of a key in modifying the data such that the encrypted data may only be decrypted to the data by using the key. In some illustrative examples, the decryption of the encrypted data uses a different key than the encryption of the data.

The encrypted data may be stored in a volume in the data processing system. A volume is an element in a data processing system that stores data in the data processing system. A data processing system may store data for multiple users. When the data is encrypted and stored in the data processing system, the data may be encrypted using a different key for each user. Of course, multiple users may use the same key for encryption and/or decryption in other illustrative embodiments. For example, a group of users may use a first key, and a single user may use a second key.

Unauthorized users may desire to access encrypted data for which the unauthorized users do not have the key. The unauthorized users may attempt to identify the key for the encrypted data by analyzing the encrypted data. For example, the unauthorized users may attempt to identify the difference between the encrypted data before and after the encrypted data is modified by an authorized user. The unauthorized user may use the differences between the encrypted data before and after being modified to identify the key used to encrypt and/or decrypt the encrypted data.

SUMMARY

A method, computer program product, and apparatus for managing encrypted data are provided. A respective set of sectors in each page of the volume is selected for storing data based on a respective key in a number of keys responsive to receiving a request to store the data in the volume and an identification of the number of keys with which users are allowed to store the data in the volume. Selection of the respective set of sectors is a function of a value of the respective key and a number of available sectors within a page and the volume is much larger than the data. The data is encrypted using the respective key to form the encrypted data. The encrypted data is stored in the respective set of sectors in the page in the volume.

BRIEF DESCRIPTION OF THE SEVERAL VIEWS OF THE DRAWINGS

The novel features believed characteristic of the illustrative embodiments are set forth in the appended claims. The advantageous embodiments, however, as well as a preferred mode of use, further objectives and advantages thereof, will best be understood with reference to the following detailed description of an illustrative embodiment of the present disclosure when read in conjunction with the accompanying drawings, wherein:

FIG. 1 is an illustration of a diagram of a volume in accordance with an illustrative embodiment;

FIG. 4 is an illustration of a selection of sectors in accordance with an illustrative embodiment;

FIG. 5 is an illustration of a plurality of sectors with sector numbers in accordance with an illustrative embodiment;

FIG. 6 is an illustration of a plurality of area sectors with key identifiers in accordance with an illustrative embodiment;

DETAILED DESCRIPTION

Figure 2:
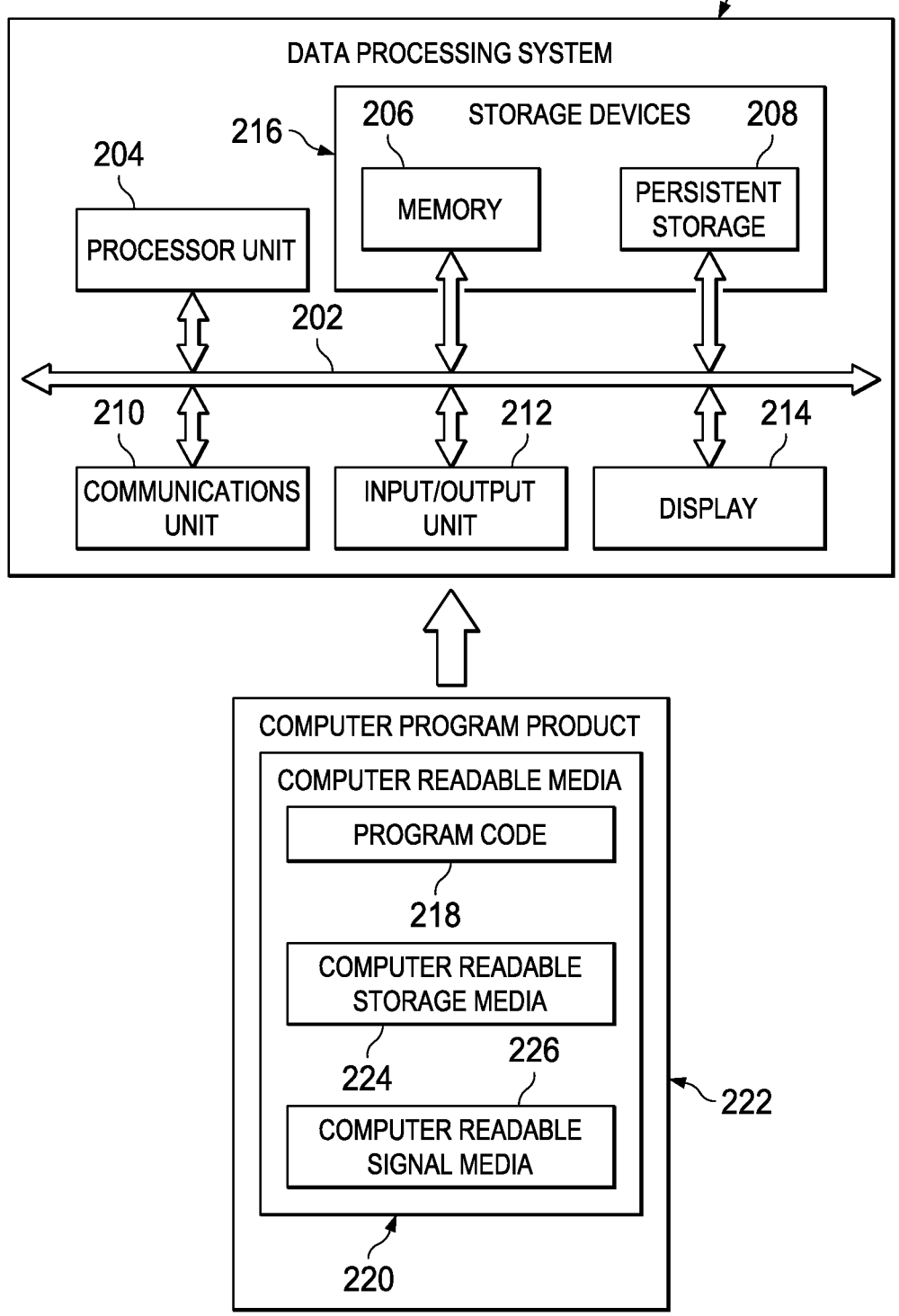
FIG. 2 is an illustration of a data processing system is depicted in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with a system that processes instructions, apparatuses, or devices.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system that processes instructions, apparatuses, or devices.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run or be processed completely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatuses (systems) and computer program products according to illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture, including instructions, which implement the function/act specified in the flowchart and/or block diagram block or blocks.

The computer program instructions may also be loaded onto a computer, other programmable data processing apparatuses, or other devices to cause a series of operational steps to be performed on the computer, other programmable apparatus or other devices to produce a computer implemented process such that the instructions, which are processed on the computer or other programmable apparatus, provide processes for implementing the functions/acts specified in the flowchart and/or block diagram block or blocks.

Figure 1:
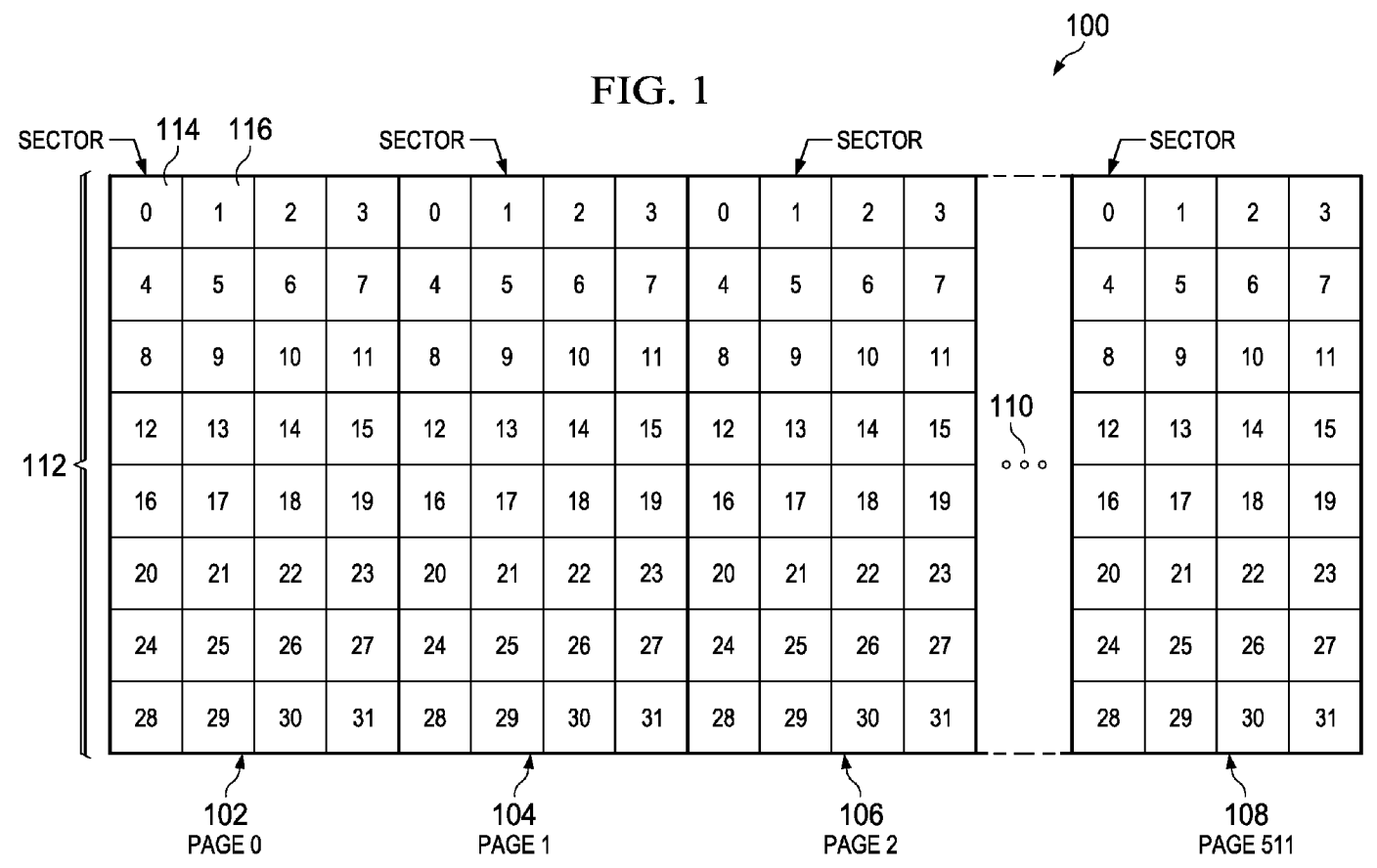

With reference now to FIG. 1, an illustration of a diagram of a volume is depicted in accordance with an illustrative embodiment. Volume 100 is an example of a volume in which illustrative embodiments may be implemented. Volume 100 is a data structure that stores data in a data processing system. In the illustrative examples, volume 100 is a file stored in a file system. However, volume 100 may also be a physical device, such as a hard disk.

Volume 100 contains pages 102, 104, 106, and 108. Pages 102, 104, 106, and 108 are portions of volume 100. Pages 102, 104, 106, and 108 are physical portions of volume 100 in this illustrative embodiment. In this illustrative example, pages 102, 104, 106, and 108 each have the same size. However, in other illustrative embodiments, each of pages 102, 104, 106, and 108 may have a different size. Additionally, the size of pages 102, 104, 106, and 108 is not intended to be limiting. The size of pages 102, 104, 106, and 108 may be different in other illustrative embodiments. Ellipses 110 indicate that additional pages are present in volume 100 not depicted in FIG. 1. For example, volume 100 may contain about 511 pages, but only pages 102, 104, 106, and 108 of volume 100 are depicted in FIG. 1.

Pages 102, 104, 106, and 108 are each divided into sectors. A sector is an area within a page that stores data. For example, page 102 contains sectors 112. Each of sectors 112 may store a different collection of data. For example, sector 114 may store about a first megabyte of data and sector 116 may store about a second megabyte of data. In this illustrative example, sectors 112 are the same size. In other words, sectors 112 may each store the same amount of data. In other illustrative examples, sectors 112 may be of different sizes. In this illustrative example, sectors 112 each store about one megabyte of data. Sectors 112 may also store data encrypted using different encryption keys. For example, the data stored in sector 114 may be encrypted using a first encryption key and the data stored in sector 116 may be encrypted using a second encryption key. In these illustrative examples, sector 114 is also decrypted using a different decryption key than sector 116.

Figure 3:
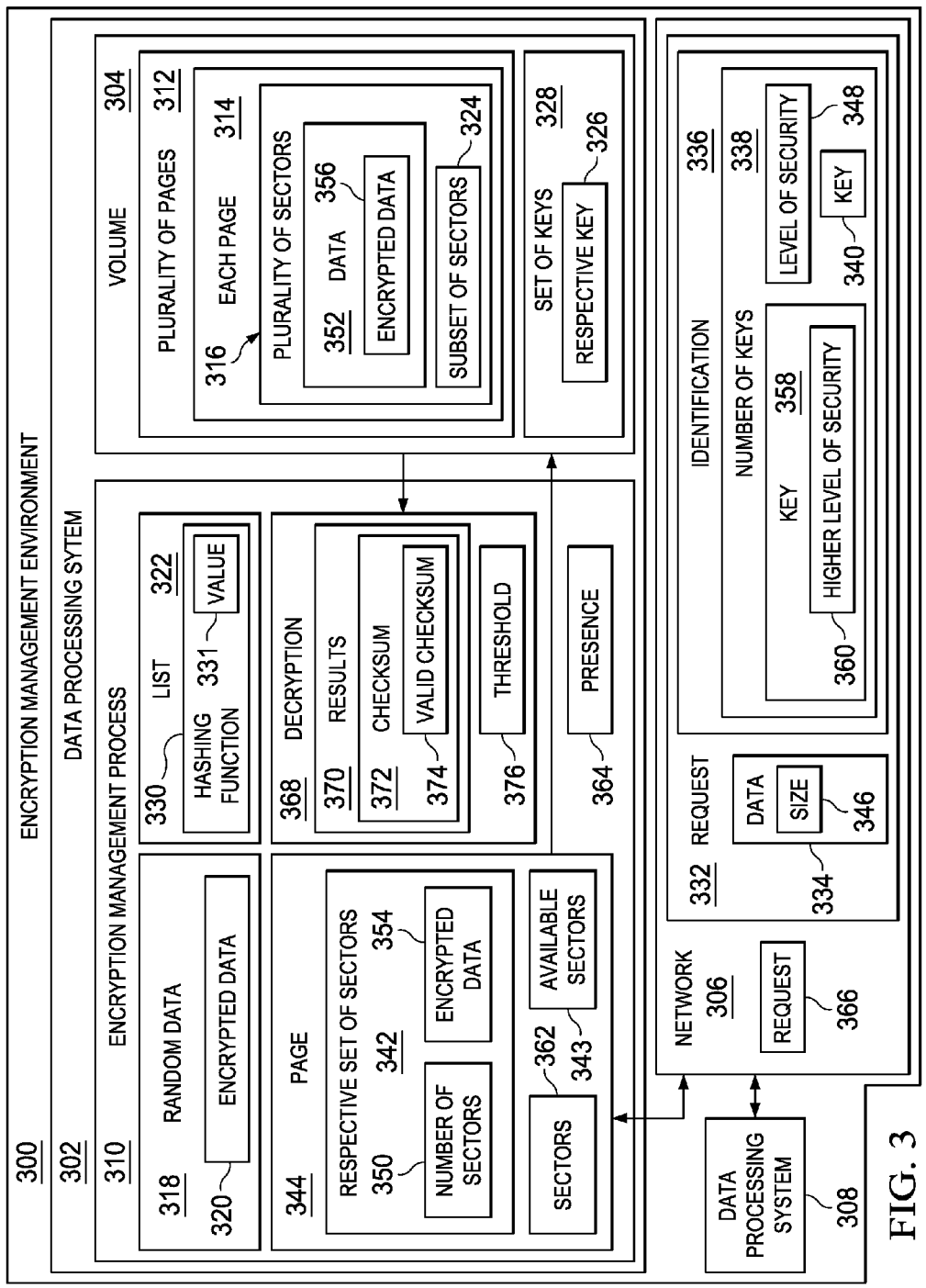
FIG. 3 is an illustration of a block diagram of an encryption management environment in accordance with an illustrative embodiment.

An encryption management process, such as encryption management process 310 in FIG. 3, may generate volume 100. The encryption management process also generates a list of sectors for each page, such as list 400 in FIG. 4. The list indicates which sectors in the page are available to store data. In other words, the list indicates which sectors are not currently storing data. Further, the list also includes the particular encryption key to which each sector in the page in volume 100 is assigned.

Turning now to FIG. 2, an illustration of a data processing system is depicted in accordance with an illustrative embodiment. Data processing system 200 may be used in the illustrative embodiments to manage and store information in volume 100 in FIG. 1. Further, data processing system 200 may be used to generate a list of available sectors in a page, such as list 400 in FIG. 4.

In this illustrative example, data processing system 200 includes communications fabric 202, which provides communications between processor unit 204, memory 206, persistent storage 208, communications unit 210, input/output (I/O) unit 212, and display 214.

Processor unit 204 is hardware and processes instructions for software that may be loaded into memory 206. Processor unit 204 may be a number of processors, a multi-processor core, or some other type of processor, depending on the particular implementation. A "number", as used herein with reference to an item, means "one or more items." Further, processor unit 204 may be implemented using a number of heterogeneous processor systems in which a main processor is present with secondary processors on a single chip. In another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may also be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for processing by processor unit 204. The processes of the different illustrative embodiments may be performed by processor unit 204 using computer implemented instructions, which may be located in a memory, such as memory 206.

These instructions are referred to as program code, computer usable program code, or computer readable program code that may be read and processed by a processor in processor unit 204. The program code in the different illustrative embodiments may be embodied on different physical or computer readable storage media, such as memory 206 or persistent storage 208.

Program code 218 is located in a functional form on computer readable media 220 that is selectively removable and may be loaded onto or transferred to data processing system 200 for processing by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 may also take the form of a persistent storage, such as a hard drive, a thumb drive, or a flash memory, that is connected to data processing system 200. In particular, these media are hardware devices and may be referred to as computer readable storage devices. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in these illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different illustrative embodiments may be implemented. The different illustrative embodiments may be implemented in a data processing system including components in addition to or in place of those illustrated for data processing system 200. Other components shown in FIG. 2 can be varied from the illustrative examples shown. The different illustrative embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The different illustrative embodiments recognize and take into account a number of different considerations. For example, the different illustrative embodiments recognize and take into account that a first user may desire to store data in a volume containing encrypted data without other users of the volume becoming aware that the data of the first user is stored in the volume. For example, the first user may desire to secure data in the volume without other users of the volume becoming aware that the first user has stored the secure data in the volume. Secure data is information to which a user desires to limit access. The secure data may include information that is confidential. For example, secure data may include passwords, credit card information, and/or other suitable information.

The different illustrative embodiments also recognize and take into account that storing data in a volume using multiple keys allows a user to prevent an application running in the data processing system from accessing or modifying secure data in a volume that is encrypted with a different key than the other data in the volume because the application is unaware of the existence of the secure data in the volume. The application may access some data in the volume that is encrypted with a key to which the application has access. However, the application is unable to access other data encrypted with another key to which the application does not have access.

Thus, the different illustrative embodiments provide a method, a computer program product, and apparatus for managing encrypted data. A respective set of sectors in each page of the volume is selected for storing the data based on a respective key in a number of keys responsive to receiving a request to store data in the volume and an identification of the number of keys with which users are allowed to store the data in the volume. Selection of the set of sectors is a function of a value of the respective key and a number of available sectors within a page and the volume is much larger than the data. The data is encrypted using the respective key to form the encrypted data. The encrypted data is stored in the respective set of sectors in the page in the volume.

Turning now to FIG. 3, an illustration of a block diagram of an encryption management environment is depicted in accordance with an illustrative embodiment. Encryption management environment 300 is an example of an environment in which illustrative embodiments may be implemented. Data processing system 302 in encryption management environment 300 contains volume 304. Volume 304 is an example of volume 100 in FIG. 1. Volume 304 may be in the form of a storage device, such as a hard drive. Volume 304 may also be in the form of a file stored in a file system on a storage device in a data processing system. Volume 304 may also be in the form of a database.

Encryption management environment 300 contains data processing system 302, network 306, and data processing system 308. Data processing system 302 and data processing system 308 are example implementations of data processing system 200 in FIG. 2. Data processing system 302 and data processing system 308 communicate using network 306. Network 306 is a link between data processing system 302 and data processing system 308 that allows data processing system 302 and data processing system 308 to communicate with one another. For example, network 306 may be a local area network (LAN), wide area network (WAN), the Internet, or another suitable network in some illustrative embodiments.

Data processing system 302 runs encryption management process 310 using a processor unit, such as processor unit 204 in FIG. 2. Data processing system 302 also includes volume 304. Volume 304 is an element that stores data in data processing system 302. In some illustrative embodiments, volume 304 is a storage device, such as storage devices 216 in FIG. 2. In other illustrative embodiments, volume 304 is a file stored in a file system of a storage device in data processing system 302.

Encryption management process 310 divides volume 304 into plurality of pages 312. Plurality of pages 312 are sections of volume 304. Each page 314 in volume 304 is the same size in this illustrative embodiment. In other illustrative embodiments, some pages in plurality of pages 312 have a different size than other pages.

Encryption management process 310 then divides each page 314 in plurality of pages 312 into plurality of sectors 316. Plurality of sectors 316 are subdivisions of each page 314 in plurality of pages 312. In some illustrative embodiments, plurality of sectors 316 are sectors of a page in volume 304, such as sectors 112 of page 102 in FIG. 1. A page is a contiguous block of memory in volume 304. A sector is a unit of memory of a particular size within a page. For example, a sector may be about 16 kilobytes. In these illustrative examples, each page 314 of plurality of pages 312 is the same size. Additionally, each sector in plurality of sectors 316 is the same size. However, in other illustrative embodiments, each sector in plurality of sectors 316 may have different sizes.

Encryption management process 310 then generates random data 318. Random data 318 is data without a particular pattern. Random data 318 may be generated using a random number generator. Of course, random data 318 may contain one or more patterns in some illustrative embodiments. Encryption management process 310 then stores random data 318 in plurality of sectors 316. Encryption management process 310 may store random data 318 in plurality of sectors 316 for each page 314 or a particular page in plurality of pages 312. Random data 318 is generated and stored in plurality of sectors 316 to prevent an unauthorized user from identifying sectors in plurality of sectors 316 that have changed after one or more sectors in plurality of sectors 316 are modified.

Encryption management process 310 then associates subset of sectors 324 in plurality of sectors 316 with respective key 326 in set of keys 328. Subset of sectors 324 is a collection of sectors in plurality of sectors 316 that are to be associated with a particular key for volume 304. A particular subset of sectors 324 is associated with a respective key in set of keys 328. In other words, a first subset of sectors 324 may be associated with a first key in set of keys 328. A second subset of sectors 324 may be associated with a second key in set of keys 328. The key is an encryption and/or decryption key in these illustrative embodiments. Set of keys 328 is a collection of keys that may be used to encrypt and/or decrypt data in volume 304. Set of keys 328 may be stored in another data source, such as a database. Set of keys 328 may also be stored in another data processing system in some illustrative embodiments.

Encryption management process 310 associates subset of sectors 324 with respective key 326 in set of keys 328 by processing respective key 326 and subset of sectors 324 with hashing function 330. Hashing function 330 is a mathematical function that converts respective key 326 into value 331. Value 331 is a number in this illustrative embodiment that is generated as a result of processing respective key 326 with hashing function 330. Encryption management process 310 then uses value 331 to identify subset of sectors 324 in plurality of sectors 316 with which respective key 326 is associated. For example, in an illustrative example, plurality of sectors 316 includes 32 sectors, and three keys may be used to store data in volume 304. Hashing function 330 is Message-Digest algorithm 5 (MD5) in this illustrative example. Of course, in other illustrative embodiments, a function other than a hashing function may be used.

Encryption management process 310 processes a combination of identifiers for plurality of sectors 316 and an identifier for respective key 326 to identify the sectors in plurality of sectors 316 that are to be associated with respective key 326. Encryption management process 310 stores the associations in list 322. Of course, list 322 may be represented in other data structures in other illustrative embodiments. For example list 322 may be in the form of a database, a linked list, or another suitable structure. In some illustrative embodiments, keys may be removed from list 322 at a later time. Additional keys and identifiers for the additional keys may also be added to list 322. In such an illustrative embodiment, additional sectors in plurality of sectors 316 may be generated and associated with the identifiers for the additional keys.

Once volume 304 is processed and list 322 is generated, encryption management process 310 waits for requests. In this illustrative embodiment, encryption management process 310 waits for request using network 306. In this illustrative example, encryption management process 310 receives request 332 to store data 334 in volume 304 from data processing system 308 using network 306. In this illustrative embodiment, volume 304 is much larger than data 334. More specifically, volume 304 is larger than data 334 such that data 334 may be stored within a number of pages in volume 304, where the number of pages is less than the total number of pages in volume 304. Volume 304 has multiple pages in this illustrative embodiment, for example, pages 102, 104, 106, and 108 in FIG. 1. Request 332 includes identification 336 of number of keys 338. Identification 336 is information for a location of number of keys 338. Number of keys 338 may be included in request 332 or identification 336 may indicate that number of keys 338 is to be retrieved from elsewhere, such as another data processing system.

Number of keys 338 is one or more encryption and/or decryption keys to be used to encrypt and store data 334. As used herein, a "number of" means "one or more of the item." For example, a number of keys means one or more keys. Encryption management process 310 then selects page 344 in plurality of pages 312 in which to store data 334. Encryption management process 310 may select page 344 based on size 346, randomly, or using a policy accessible to encryption management process 310.

Once page 344 is selected, encryption management process 310 uses key 340 in number of keys 338 to select respective set of sectors 342 in page 344 in which to store data 334. In some illustrative embodiments, the quantity of sectors to use in storing data 334 is also selected using size 346 of data 334. In other illustrative embodiments, encryption management process 310 identifies respective set of sectors 342 in page 344 by identifying available sectors 343 for page 344 in list 322. Once respective set of sectors 342 is selected, list 322 is modified to indicate that respective set of sectors 342 is not available for storing data. Because encryption management process 310 identifies available sectors 343 for page 344 in list 322, encryption management process 310 will not identify a sector that is used by another key that is not included in number of keys 338.

Encryption management process 310 then encrypts data 334 using key 340 to form encrypted data 354. Encryption management process 310 also encrypts data 352 using key 340 to form encrypted data 356. Data 352 is the data currently stored in plurality of sectors 316 in page 344. Encryption management process 310 stores encrypted data 354 in respective set of sectors 342 and encrypted data 356 in plurality of sectors 316.

In another illustrative embodiment, number of keys 338 in request 332 includes key 340 and key 358. In such an illustrative embodiment, number of keys 338 is ordered by level of security 348. In other words, one key in number of keys 338 is identified by encryption management process 310 to be higher level of security 360. Encryption management process 310 may identify level of security 348 for each of number of keys 338 using set of keys 328 for volume 304.

In illustrative embodiments in which number of keys 338 includes key 340 and key 358, encryption management process 310 uses key 358 to encrypt data 334 and form encrypted data 354 instead of key 340 because key 358 is higher level of security 360 in this example. Encryption management process 310 then encrypts random data 318 stored in sectors 362 of page 344 that store random data 318 to form encrypted data 320. Encryption management process 310 uses key 340 to encrypt random data 318 so a request that only contains the lower security key 340 may access data that was not encrypted with key 358. Encryption management process 310 stores encrypted data 320 in sectors 362. In these illustrative embodiments, encryption management process 310 also encrypts data 352 with key 340 so that all the data in page 344 is modified in illustrative examples in which key 358 is used to encrypt data 334. Thus, presence 364 of encrypted data 354 is unknown to unauthorized users when key 358 is used to encrypt data 334.

In these illustrative examples, encryption management process 310 receives request 366 from data processing system 308 to retrieve data 334 from volume 304. Request 366 includes identification 336 for number of keys 338. Request 366 may also include an identifier for data 334. For example, request 366 may include a file name or file identifier of data 334. Encryption management process 310 identifies a location of data 334 in volume 304. Encryption management process 310 then begins decryption 368 of encrypted data 354 using number of keys 338.

Since encrypted data 354 may have been re-encrypted a number of times since data 334 was stored in volume 304 due to modification of data in volume 304, decryption 368 is repeated until results 370 of decryption 368 are data 334. In other illustrative embodiments, decryption 368 is repeated until checksum 372 of results 370 is valid checksum 374. Checksum 372 is a value calculated from contents of results 370 that indicates whether results 370 are valid data. For example, checksum 372 may be a cyclic redundancy check (CRC) value. In some illustrative embodiments, decryption 368 is repeated until threshold 376 is reached. For example, threshold 376 may be about ten repetitions of decryption 368.

The illustration of data processing system 302 in encryption management environment 300 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, data processing system 308 is not present. In such illustrative embodiments, request 332 is sent by another process running on data processing system 302. Request 332 may be sent via inter-process communication in such an illustrative embodiment. Of course, other ways of sending request 332 between processes running on data processing system 302 will be apparent to those skilled in the art.

With reference now to FIG. 4, an illustration of a selection of sectors is depicted in accordance with an illustrative embodiment. Table 400 depicts one illustrative example of selecting a respective set of sectors, such as respective set of sectors 342 in FIG. 3. Table 400 represents selection of a respective set of sectors in a particular page in a volume. For example, the selection of the respective set of sectors may be the process in FIG. 11. In this illustrative embodiment, two keys are used in the selection of sectors. Of course, in other illustrative embodiments, additional keys may be used.

In this illustrative example, an encryption management process, such as encryption management process 310 in FIG. 3, processes a primary key and a secondary key to select a respective set of sectors for each key. The primary key may be key 340, and the secondary key may be key 358 in FIG. 3. Column 402 indicates which key is being used to select an available sector in the particular row. For example, entry 412 indicates that row 413 is the selection of a first sector for the primary key.

Column 404 represents the list of available sectors when the selection of the particular row is made. List 414 is an example implementation of list 322 in FIG. 3. In other words, list 414 represents available sectors in a particular page of a volume. In this illustrative example, list 414 represents the list of available sectors at the time sector 0 for the primary key is selected. Column 406 represents the value generated by a hashing function for the combination of the key and sector in the particular row. The hashing function may be hashing function 330 in FIGS. 435, 436, 438, 440, 442, and 444, respectively.

In row 446, the first sector, represented as sector 0, is selected for association with the secondary key. List 448 indicates the list of available sectors when the sector is selected. Entry 450 indicates the cyclic redundancy check value for the combination of the secondary key and 0, representing the first sector selected for association with the secondary key. The encryption management process then generates entry 452, the result of the modulo operation on entry 450 and 24, the length of list 448. In this illustrative example, entry 452 is 0. Thus, selected sector 454 is 0. Sector 0 is removed from list 448 to form list 456. The process continues for rows 458, 460, 462, 464, 466, 468, and 470.

Figure 7:
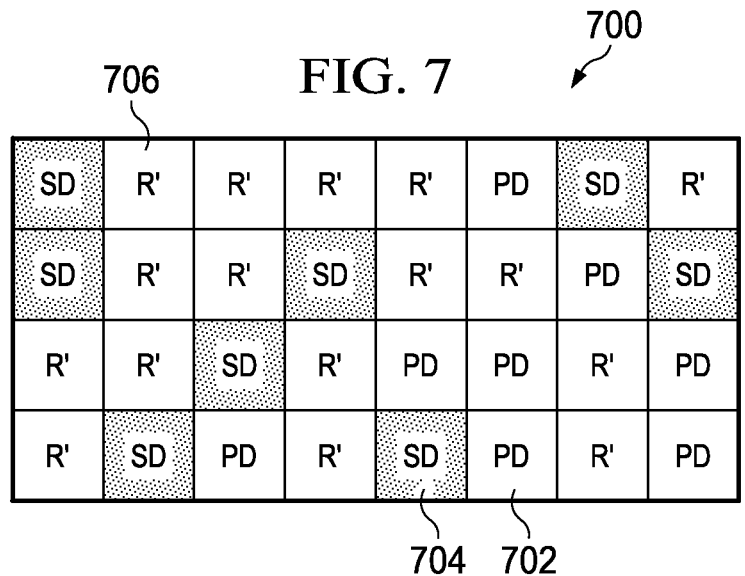
FIG. 7 is an illustration of a plurality of sectors after writing data encrypted with the primary key and secondary key 1 in accordance with an illustrative embodiment.
Figure 8:
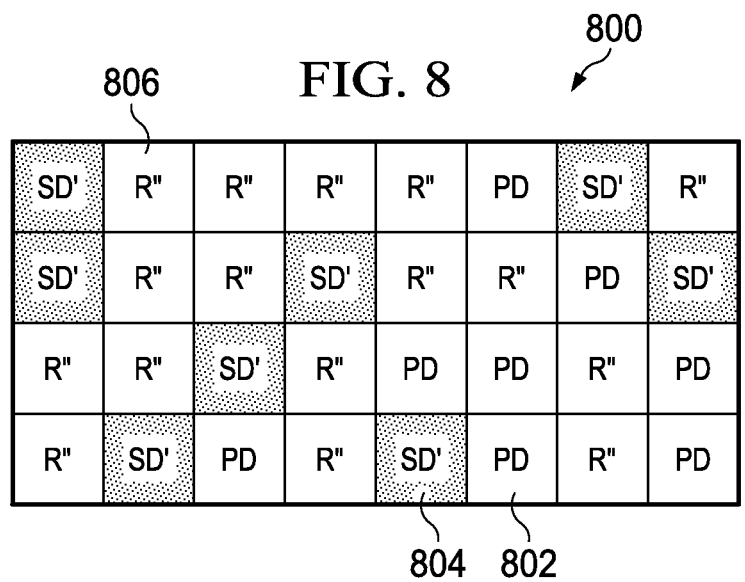
FIG. 8 is an illustration of a plurality of sectors after writing data encrypted with the primary key in accordance with an illustrative embodiment.

FIGS. 5-8 depict an example of data sectors processed in accordance with an illustrative embodiment. FIG. 5 presents an illustration of a plurality of sectors with numbered sectors. FIG. 6 is an illustration of the plurality of sectors with indications of which key was used to encrypt data in a particular sector. FIG. 7 is an illustration of a plurality of sectors after data was stored in the plurality of sectors using the primary key and the secondary key. FIG. 8 is an illustration of the plurality of sectors after data was stored in the plurality of sectors using only the primary key.

Turning first to FIG. 5, an illustration of a plurality of sectors with sector numbers is depicted in accordance with an illustrative embodiment. Plurality of sectors 500 is an example implementation of plurality of sectors 316 in FIG. 3. Further, plurality of sectors 500 is an example of a plurality of sectors described in list 400 in FIG. 4.

In this illustrative example, sector 502 represents sector 29 from list 400. As indicated in entries 406 and 408, sector 502 is designated as being associated with the primary key. Likewise, sector 504 represents sector 28 of plurality of sectors 500 from list 400. As indicated in entries 410 and 412, sector 504 is designated as being associated with secondary key 1.

With reference now to FIG. 6, an illustration of a plurality of sectors with key identifiers is depicted in accordance with an illustrative embodiment. Plurality of sectors 600 is another representation of plurality of sectors 500 in FIG. 5. More specifically, plurality of sectors 600 is represented by the key to which each sector is as signed.

In this illustrative example, sector 602 represents sector 29 from list 400 in FIG. 4. As indicated in entries 406 and 408, sector 602 is designated as being associated with the primary key. Likewise, sector 604 represents sector 28 of plurality of sectors 600 from list 400. As indicated in entries 410 and 412, sector 604 is designated as being associated with secondary key 1.

Turning now to FIG. 7, an illustration of a plurality of sectors after writing data encrypted with the primary key and secondary key 1 is depicted in accordance with an illustrative embodiment. Plurality of sectors 700 is a representation of plurality of sectors 600 in FIG. 6 after data is encrypted and stored in plurality of sectors 700 by a request that contained both the primary key and secondary key 1.

Since both the primary key and secondary key 1 were present during the encryption and storage of data in plurality of sectors 700, sectors that are associated with the primary key were encrypted with the primary key. For example, sector 702 was encrypted with the primary key. Likewise, sector 704 was encrypted with secondary key 1 since secondary key 1 was included in the request and sector 704 is associated with the secondary key 1. As illustrated herein, R' represents random data encrypted with the primary key. For example, sector 706 contains random data encrypted with the primary key.

With reference to FIG. 8, an illustration of a plurality of sectors after writing data encrypted with the primary key is depicted in accordance with an illustrative embodiment. Plurality of sectors 800 is a representation of plurality of sectors 700 in FIG. 7 after data is encrypted and stored in plurality of sectors 800 by a request that contained the primary key but not secondary key 1.

Since only the primary key was present during the encryption and storage of data in plurality of sectors 700, all sectors in plurality of sectors 700 were encrypted with the primary key. More specifically, sectors storing random data, such as sector 806, sector 804 associated with secondary key 1, and sector 802 associated with the primary key were encrypted using the primary key. Thus, sector 804 appears to the user to be random because the user did not provide secondary key 1. Sector 804 is designated in FIG. 8 as SD' because sector 804 contains data encrypted with the secondary key and then encrypted with the primary key. Because all the sectors in plurality of sectors 800 changed when the data was written to plurality of sectors 800, an unauthorized user that does not have the secondary key is unable to identify which sectors in plurality of sectors 800, if any, are encrypted with secondary key 1. Further, sector 806 is designated as R", indicating that the random data in sector 806 has been encrypted using the primary key twice.

Of course, in other illustrative embodiments, fewer than all sectors in plurality of sectors 800 may be encrypted with the primary key. For example, a subset of plurality of sectors 800 may be encrypted with the primary key.

Figure 9:
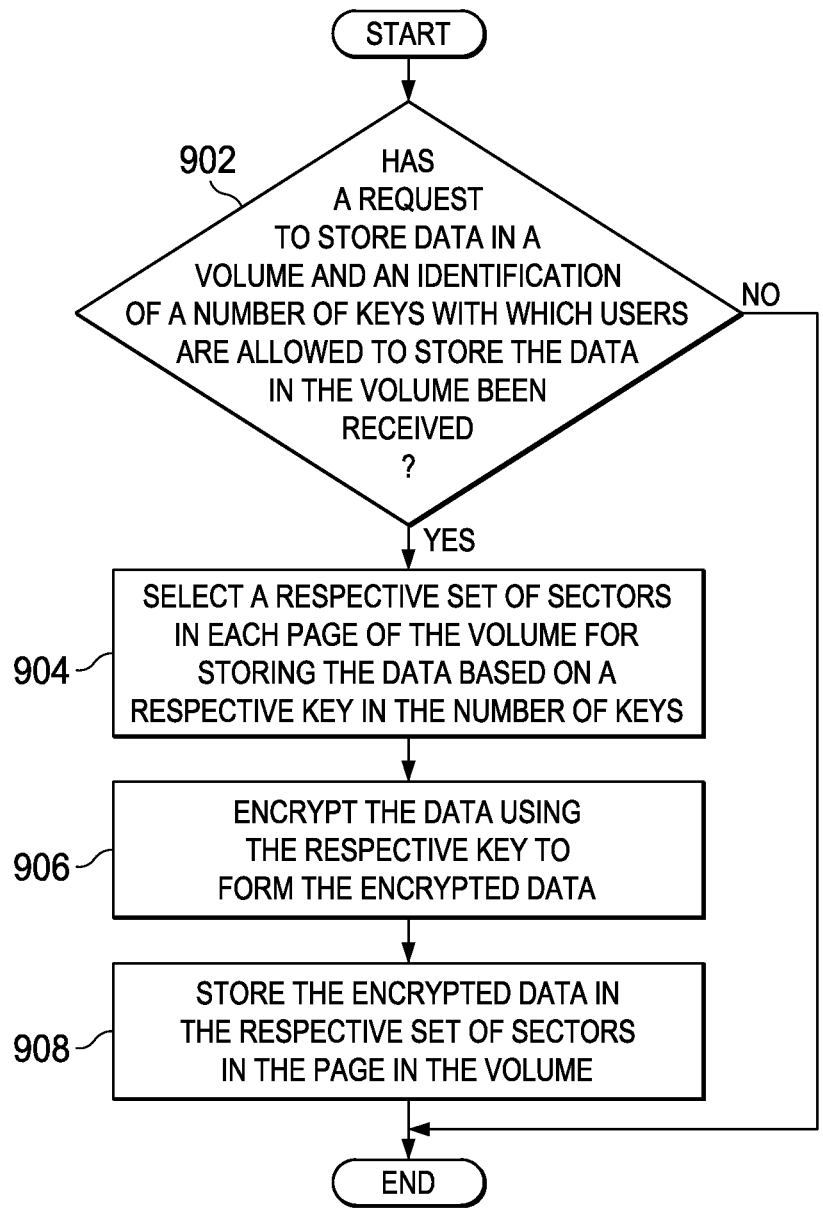
FIG. 9 is an illustration of a flowchart of a process for managing encryption of data in accordance with an illustrative embodiment.

Turning now to FIG. 9, an illustration of a flowchart of a process for managing encryption of data is depicted in accordance with an illustrative embodiment. The process may be performed by encryption management process 310 running on data processing system 302 in encryption management environment 300 in FIG. 3.

The process begins by determining whether a request to store data in a volume and an identification of a number of keys with which users are allowed to store the data in the volume has been received (step 902). The number of keys may be number of keys 338 in FIG. 3. In the event that the process determines that a request has not been received, the process terminates. If the process determines that a request has been received, the process selects a respective set of sectors in each page of the volume for storing the data based on a respective key in the number of keys (step 904). The process may select the respective set of sectors in a list, such as list 400 in FIG. 4.

The process then encrypts the data using the respective key to form the encrypted data (step 906). The process may encrypt the data using an encryption algorithm, such as the Blowfish encryption algorithm. The process then stores the encrypted data in the respective set of sectors in the page in the volume (step 908). The process terminates thereafter.

Figure 10:
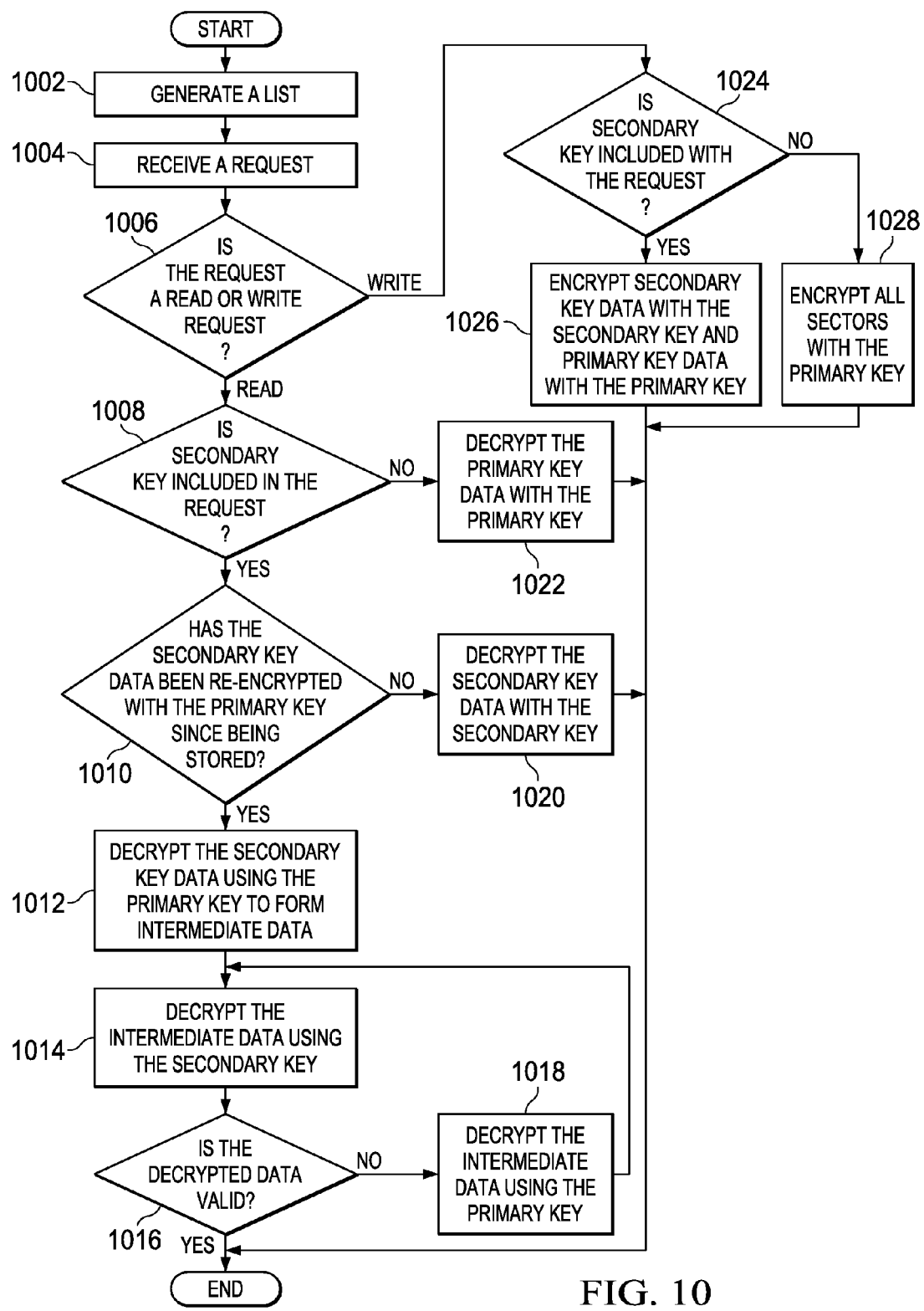
FIG. 10 is a flowchart of a process for encrypting data in accordance with an illustrative embodiment.

Looking now to FIG. 10, a flowchart of a process for encrypting data is depicted in accordance with an illustrative embodiment. The process may be performed by encryption management process 310 running on data processing system 302 in encryption management environment 300 in FIG. 3.

Figure 11:
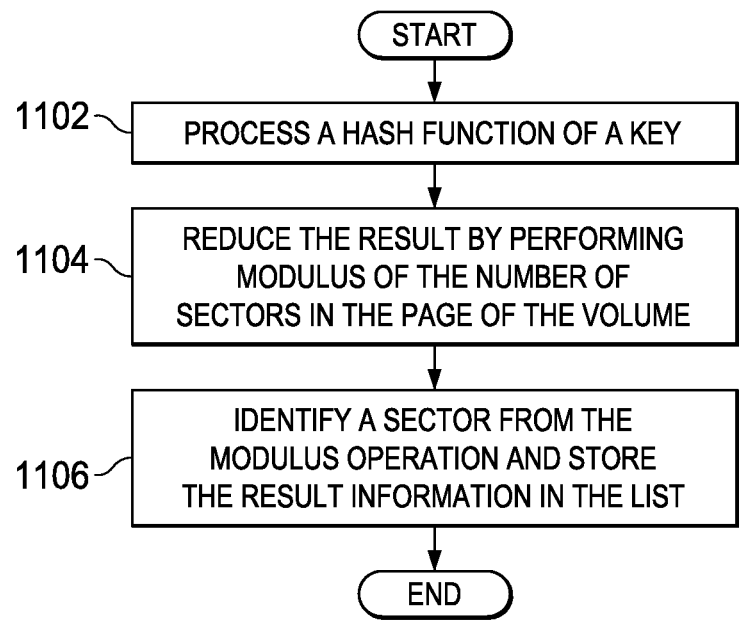
FIG. 11 is a flowchart of a process for generating a list in accordance with an illustrative embodiment.

The process begins by generating a list (step 1002). The list is a data source including associations between sectors in a volume and keys in a plurality of keys, such as set of keys 328 in FIG. 3. An example implementation of step 1002 is depicted in FIG. 11. The process then receives a request (step 1004). The request may include an identification of a type of operation to be performed. The request may also include a number of keys.

The process then determines whether the request is a read request or a write request (step 1006). If the process is a read request, the process determines whether the secondary key is included in the request (step 1008). The secondary key is an example of key 358 in FIG. 3. If the process determines that the secondary key is included in the request at step 1008, the process determines whether the secondary key data has been re-encrypted with the primary key since being stored (step 1010). The secondary key data may have been re-encrypted with the primary key in the event that data in the volume has been modified. The process may use information about whether the secondary key data has been re-encrypted with the primary key since being stored to perform step 1010. The process may also store a value that indicates the number of times the secondary key data has been re-encrypted using the primary key.

If the process determines that the secondary key data has been re-encrypted with the primary key since being stored at step 1010, the process decrypts the secondary key data using the primary key to form intermediate data (step 1012). The process then decrypts the intermediate data using the secondary key (step 1014). The process then determines whether the decrypted data is valid (step 1016). The process may use a cyclic redundancy check value or another suitable value to determine whether the decrypted data is valid. If the process determines that the decrypted data is valid at step 1016, the process terminates.

If the process determines that the decrypted data is not valid at step 1016, the process decrypts the intermediate data formed in step 1012 using the primary key (step 1018). The process then returns to step 1014. In illustrative embodiments in which the process performs step 1018, the process performs step 1018 because the data may have been encrypted one or more times with the primary key after being encrypted with the secondary key. For example, the data may have been encrypted using the primary key during a modification of the volume.

With reference again to step 1010, if the process determines that the secondary key data has not been re-encrypted with the primary key since being stored, the process decrypts the secondary key data with the secondary key (step 1020). Secondary key data is data stored in a page of the volume that is in a sector associated with the secondary key. The process terminates thereafter. If the process determines that the secondary key is not present in the request at step 1008, the process decrypts the primary key data with the primary key (step 1022). Primary key data is data stored in a page of the volume that is in a sector associated with the primary key. The process terminates thereafter.

If at step 1006 the process determines that the request is a write request, the process determines whether the secondary key is included with the request (step 1024). If the process determines that the secondary key is included with the request at step 1024, the process encrypts secondary key data with the secondary key and primary key data with the primary key (step 1026). The process terminates thereafter. If the process determines that the secondary key is not included in the request at operation 1024, the process encrypts all sectors with the primary key (step 1028). Of course, in some illustrative embodiments, the process only encrypts a subset of the sectors with the primary key at step 1028. The process terminates thereafter.

Turning now to FIG. 11, a flowchart of a process for generating a list is depicted in accordance with an illustrative embodiment. The process may be performed by encryption management process 310 running on data processing system 302 in encryption management environment 300 in FIG. 3. The process is an example implementation of step 1002 in FIG. 10.

The process begins by processing a hash function of a key (step 1102). The hash function is an example of hashing function 330 in FIG. 3. For example, the hash function may be Message-Digest algorithm 5 (MD5), Fowler-Noll-Vo, Jenkins, Pearson hashing, Zobrist, or another suitable hash function.

The process then reduces the result by performing modulus of the number of sectors in the page of the volume (step 1104). The process then identifies a sector from the modulus operation and stores the result information in the list (step 1106). The process terminates thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be processed substantially concurrently, or the blocks may sometimes be processed in the reverse order, depending upon the functionality involved.

For example, the process may receive the request using inter-process communication at step 1102. Additionally, the volume may be located in a different data processing system than the data processing system that runs the encryption management process. Thus, the process may request data from the volume using a network or another suitable communications link prior to performing step 1104.

Thus, the different illustrative embodiments allow a user to store encrypted data in a volume without unauthorized users becoming aware of the presence of the encrypted data. The unauthorized users may use another key to encrypt and decrypt data in the same volume without being able to identify if information associated with another key is present in the volume. The unauthorized user is also unable to identify which areas of the volume contain the other encrypted data, even if the unauthorized user becomes aware of the presence of the encrypted data.

The different illustrative embodiments further allow a user to add keys to be used for encryption of data in a volume. The additional keys may be added to a list of keys at any time and not only when the list is created. The different illustrative embodiments allow additional pages of the volume to be allocated to the new keys.

The different illustrative embodiments further prevent data from being stored in a page of the volume that is being used by data encrypted with another key. A list contains the pages of the volume that are associated with each of the keys that may be used in the volume. Thus, data may not be encrypted with a first key and stored in a page of the volume that is associated with a second key.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing encrypted data, wherein a volume is partitioned into a plurality of pages and each page is partitioned into a plurality of sectors, the method comprising:
   responsive to receiving a request to store data in the volume and an identification of a number of keys with which users are allowed to store the data in the volume, selecting, by a processor, a respective set of sectors in each page of the volume for storing the data based on a respective key in the number of keys, wherein selection of the respective set of sectors is a function of a value of the respective key and a number of available sectors within a page and the volume is much larger than the data;
   encrypting the data using the respective key to form the encrypted data; and
   storing the encrypted data in the respective set of sectors in the page in the volume, wherein the step of selecting, by the processor, the respective set of sectors in each page of the volume for storing the data based on the respective key in the number of keys comprises:
   identifying a subset of sectors associated with the respective key in a list; and
   selecting the respective set of sectors from the subset of sectors associated with the respective key based on a size of the data.

2. The method of claim 1 further comprising:
   prior to selecting the respective set of sectors in each page of the volume, dividing the volume into the plurality of pages;
   dividing each page in the plurality of pages into the plurality of sectors;
   storing random data in the plurality of sectors; and
   associating a subset of sectors in the plurality of sectors with a key in a set of keys for the volume.

3. The method of claim 2, wherein the function is a hashing function.

4. A method for managing encrypted data, wherein a volume is partitioned into a plurality of pages and each page is partitioned into a plurality of sectors, the method comprising:
   responsive to receiving a request to store data in the volume and an identification of a number of keys with which users are allowed to store the data in the volume, selecting, by a processor, a respective set of sectors in each page of the volume for storing the data based on a respective key in the number of keys, wherein selection of the respective set of sectors is a function of a value of the respective key and a number of available sectors within a page and the volume is much larger than the data;
   encrypting the data using the respective key to form the encrypted data;
   storing the encrypted data in the respective set of sectors in the page in the volume;
   prior to selecting the respective set of sectors in each page of the volume, dividing the volume into the plurality of pages;

dividing each page in the plurality of pages into the plurality of sectors;
storing random data in the plurality of sectors; and
associating a subset of sectors in the plurality of sectors with a key in a set of keys for the volume, wherein the data is first data and the encrypted data is first encrypted data, wherein the number of keys is ordered by a level of security, wherein the respective key is a first key, wherein the number of keys further comprises a second key, the second key has a higher level of security than the first key, and wherein the step of encrypting the data using the respective key to form the encrypted data comprises:
encrypting the data using the second key;
encrypting the random data stored in the plurality of sectors of the page of the volume that stores the random data using the first key to form second encrypted data; and
storing the second encrypted data in the respective set of sectors of the page of the volume that stores the random data.

5. The method of claim 2, wherein the data is first data and the encrypted data is first encrypted data, and wherein the step of encrypting the data using the respective key to form the encrypted data comprises:
encrypting the data using the respective key;
encrypting second data stored in the plurality of sectors to form second encrypted data; and
storing the second encrypted data in the plurality of sectors.

6. The method of claim 1, wherein the request is a first request, and further comprising:
receiving a second request for the data from a requestor, wherein the second request comprises the number of keys;
repeating a decryption of the encrypted data using the respective key until results of the decryption are the data; and
sending the data to the requestor.

7. The method of claim 6, wherein repeating the decryption of the encrypted data using the respective key until the results of the decryption are the data comprises:
determining whether a checksum for the data after the decryption is a valid checksum; and
responsive to an absence of a determination that the checksum for the data after the decryption is valid, repeating the decryption until a threshold is reached.

8. The method of claim 1, wherein a presence of the data in the volume is unknown without the respective key.

9. A computer program product for managing encrypted data, wherein a volume is partitioned into a plurality of pages and each page is partitioned into a plurality of sectors, the computer program product comprising:
a non-transitory computer recordable storage medium;
program instructions, stored on the non-transitory computer recordable storage medium, for selecting, by a processor, a respective set of sectors in each page of the volume for storing data based on a respective key in a number of keys responsive to receiving a request to store the data in the volume and an identification of the number of keys with which users are allowed to store the data in the volume, wherein selection of the set of respective sectors is a function of a value of the respective key and a number of available sectors within a page and the volume is much larger than the data;
program instructions, stored on the non-transitory computer recordable storage medium, for encrypting the data using the respective key to form the encrypted data; and
program instructions, stored on the non-transitory computer recordable storage medium, for storing the encrypted data in the respective set of sectors in the page in the volume, wherein the program instructions, stored on the non-transitory computer recordable storage medium, for selecting the respective set of sectors in each page of the volume for storing the data based on the respective key in the number of keys comprises:
program instructions, stored on the non-transitory computer recordable storage medium, for identifying a subset of sectors associated with the respective key in a list; and
program instructions, stored on the non-transitory computer recordable storage medium, for selecting the respective set of sectors from the subset of sectors associated with the respective key based on a size of the data.

10. The computer program product of claim 9 further comprising:
program instructions, stored on the non-transitory computer recordable storage medium, for dividing the volume into the plurality of pages prior to selecting the respective set of sectors in each page of the volume;
program instructions, stored on the non-transitory computer recordable storage medium, for dividing each page in the plurality of pages into the plurality of sectors;
program instructions, stored on the non-transitory computer recordable storage medium, for storing random data in the plurality of sectors; and
program instructions, stored on the non-transitory computer recordable storage medium, for associating a subset of sectors in the plurality of sectors with a key in a set of keys for the volume.

11. The computer program product of claim 10, wherein the function is a hashing function.

12. A computer program product for managing encrypted data, wherein a volume is partitioned into a plurality of pages and each page is partitioned into a plurality of sectors, the computer program product comprising:
a non-transitory computer recordable storage medium;
program instructions, stored on the non-transitory computer recordable storage medium, for selecting, by a processor, a respective set of sectors in each page of the volume for storing data based on a respective key in a number of keys responsive to receiving a request to store the data in the volume and an identification of the number of keys with which users are allowed to store the data in the volume, wherein selection of the set of respective sectors is a function of a value of the respective key and a number of available sectors within a page and the volume is much larger than the data;
program instructions, stored on the non-transitory computer recordable storage medium, for encrypting the data using the respective key to form the encrypted data;
program instructions, stored on the non-transitory computer recordable storage medium, for storing the encrypted data in the respective set of sectors in the page in the volume;
program instructions, stored on the non-transitory computer recordable storage medium, for dividing the volume into the plurality of pages prior to selecting the respective set of sectors in each page of the volume;
program instructions, stored on the non-transitory computer recordable storage medium, for dividing each page in the plurality of pages into the plurality of sectors;
program instructions, stored on the non-transitory computer recordable storage medium, for storing random data in the plurality of sectors; and program instructions, stored on the non-transitory computer recordable storage medium, for associating a subset of sectors in the plurality of sectors with a key in a set of keys for the volume, wherein the data is first data and the encrypted data is first encrypted data, wherein the number of keys is ordered by a level of security, wherein the respective key is a first key, wherein the number of keys further comprises a second key, the second key has a higher level of security than the first key, and wherein the program instructions, stored on the non-transitory computer recordable storage medium, for encrypting the data using the respective key to form the encrypted data comprises:

program instructions, stored on the non-transitory computer recordable storage medium, for encrypting the data using the second key;

program instructions, stored on the non-transitory computer recordable storage medium, for encrypting the random data stored in the plurality of sectors of the page of the volume that stores the random data using the first key to form second encrypted data; and program instructions, stored on the non-transitory computer recordable storage medium, for storing the second encrypted data in the respective set of sectors of the page of the volume that stores the random data.

13. The computer program product of claim 10, wherein the data is first data and the encrypted data is first encrypted data, and wherein the program instructions, stored on the non-transitory computer recordable storage medium, for encrypting the data using the respective key to form the encrypted data comprises:

program instructions, stored on the non-transitory computer recordable storage medium, for encrypting the data using the respective key;

program instructions, stored on the non-transitory computer recordable storage medium, for encrypting second data stored in the plurality of sectors to form second encrypted data; and program instructions, stored on the non-transitory computer recordable storage medium, for storing the second encrypted data in the plurality of sectors.

14. The computer program product of claim 9, wherein the program instructions are stored on the non-transitory computer recordable storage medium in a data processing system, and wherein the program instructions were downloaded over a network from a remote data processing system.

15. The computer program product of claim 9, wherein the program instructions are stored on the non-transitory computer recordable storage medium in a server data processing system, and wherein the program instructions are downloaded over a network to a remote data processing system for use with the remote data processing system.

16. An apparatus comprising:
a bus system;
a storage device connected to the bus system, wherein the storage device includes program code, wherein the storage device comprises a volume, wherein the volume is partitioned into a plurality of pages and each page is partitioned into a plurality of sectors; and
a processor unit connected to the bus system, wherein the processor unit processes the program code to select a respective set of sectors in each page of the volume for storing the data based on a respective key in a number of keys responsive to receiving a request to store data in the volume and an identification of the number of keys with which users are allowed to store the data in the volume, wherein selection of the respective set of sectors is a function of a value of the respective key and a number of available sectors within a page and the volume is much larger than the data; encrypt the data using the respective key to form the encrypted data; and store the encrypted data in the respective set of sectors in the page in the volume, wherein the program code to select the respective set of sectors in each page of the volume for storing the data based on the respective key in the number of keys comprises program code to identify a subset of sectors associated with the respective key in a list, and program code to select the respective set of sectors from the subset of sectors associated with the respective key based on a size of the data.

17. The apparatus of claim 16, wherein the function is a hashing function.

* * * * *